US010964008B2

(12) United States Patent
Ding et al.

(10) Patent No.: US 10,964,008 B2
(45) Date of Patent: Mar. 30, 2021

(54) SCINTILLATOR CRYSTAL EVALUATION SYSTEM

(71) Applicant: Siemens Medical Solutions USA, Inc., Malvern, PA (US)

(72) Inventors: Xinhong Ding, Buffalo Grove, IL (US); Ronald E. Malmin, Chicago, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 241 days.

(21) Appl. No.: 16/208,599

(22) Filed: Dec. 4, 2018

(65) Prior Publication Data
US 2019/0180436 A1 Jun. 13, 2019

Related U.S. Application Data

(60) Provisional application No. 62/595,622, filed on Dec. 7, 2017.

(51) Int. Cl.
*G06T 7/00* (2017.01)
*G01T 1/202* (2006.01)
*G06K 9/62* (2006.01)
*G01N 21/84* (2006.01)
*G06K 9/46* (2006.01)

(52) U.S. Cl.
CPC .......... *G06T 7/0004* (2013.01); *G01T 1/2023* (2013.01); *G06K 9/6218* (2013.01); *G06K 9/6256* (2013.01); *G06K 9/6277* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS 9,857,314 B1 * 1/2018 Yang .................... G01N 21/958
2016/0170040 A1 * 6/2016 Kim ...................... G01T 1/2985
250/366

OTHER PUBLICATIONS

Liu et al., Material Discovery: Understanding Polycrystals from Large-Scale Electron Patterns, IEEE Conference on Big Data (Year: 2016).*
Sumpter et al., On the Design, Analysis, and Characterization of Materials Using Computational Neural Networks, Annual Reviews of Material Science, (Year: 1996).*

* cited by examiner

*Primary Examiner* — Mohammed Rachedine

(57) ABSTRACT

A system and method includes acquisition of a plurality of images depicting a respective scintillator crystal, determination of a plurality of categories based on the plurality of images, determination of a crystal quality value associated with each of the plurality of categories, training of a network to receive an input image and output an indication of one of the plurality of categories based on the input image, the training based on the plurality of images and the at least one category associated with each pf the plurality of images, operation of the trained network to receive a first image of a first scintillator crystal and output a first one of the plurality of categories based on the first image, and determination of a quality of the first scintillator crystal based on the first one of the plurality of categories and a first crystal quality value associated with the first one of the plurality of categories.

19 Claims, 7 Drawing Sheets

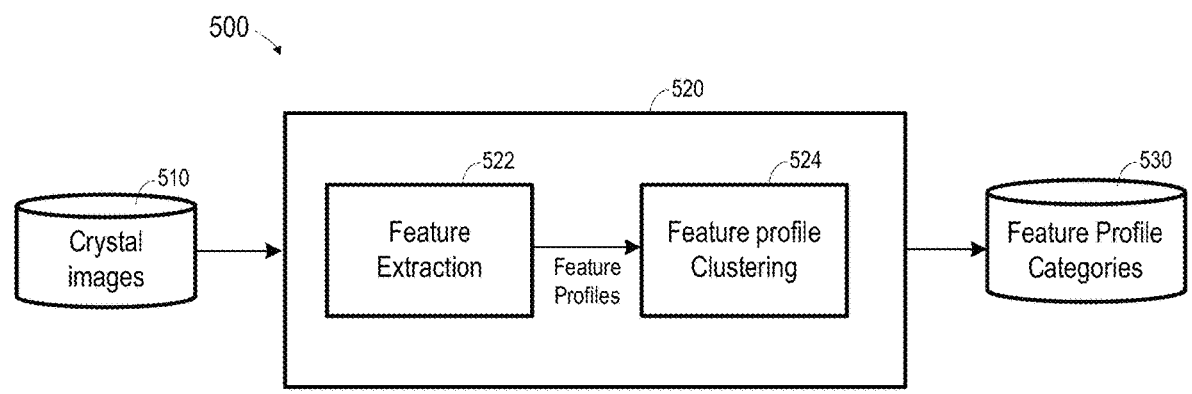
FIG. 5
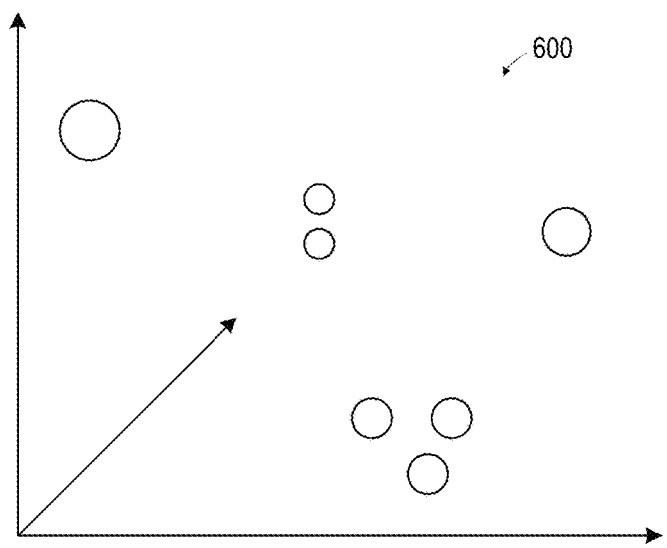
FIG. 6
| Feature Profile Category | Quality Value |
|---|---|
|  |  |
|  |  |
|  |  |
|  |  |
FIG. 7

SCINTILLATOR CRYSTAL EVALUATION SYSTEM

CROSS-REFERENCE TO RELATED APPLICATIONS

The present application is related to and claims priority to U.S. Provisional Patent Application No. 62/595,622, filed Dec. 7, 2017, the contents of which are incorporated by reference in their entirety, for all purposes.

BACKGROUND

A gamma photon detector (also, a gamma camera) typically consists of a scintillator crystal and light sensors optically coupled thereto. In operation, the scintillator crystal receives (i.e., absorbs) a gamma photon and emits a number of visible light photons in response. The light photons are in turn detected by the light sensors, which absorb the light photons and produce corresponding electrons via the photoelectric effect. The magnitude of the resulting electrical pulse is proportional to the energy of the original gamma photon received by the scintillator crystal.

Since these electrical pulses are used to generate images, the quality of the images depends in part on the scintillation properties of the scintillation crystal. More specifically, the sensitivity of the scintillation crystal to gamma photons should be suitable for the imaging system in which it is to be employed and the scintillation properties should be suitably consistent throughout the scintillation crystal (i.e., regardless of where a gamma photon is absorbed). Currently, the adequacy of a scintillation crystal is evaluated visually and subjectively, and becomes sufficiently known only after it is incorporated into an imaging system. The lack of efficient crystal evaluation systems results in excessive discarding of suitable scintillation crystals and manufacturing of then-discarded imaging systems using unsuitable crystals. Systems are desired to efficiently reduce this waste.

BRIEF DESCRIPTION OF THE DRAWINGS

FIG. 5 is a block diagram illustrating the generation of feature profile categories according to some embodiments;

FIG. 6 illustrates clusters of feature profiles according to some embodiments;

FIG. 7 is a tabular representation of data associating feature profile categories with quality values according to some embodiments;

DETAILED DESCRIPTION

The following description is provided to enable any person in the art to make and use the described embodiments. Various modifications, however, will remain apparent to those in the art.

Embodiments described herein provide a system to evaluate scintillator crystal quality. Initially, categories of crystals are determined based on available scintillator crystal images. Quality values for each category are also established. The available images and their determined categories are then used as reference data sets to train a classification network. To evaluate an unknown scintillator crystal, an image of the crystal is input to the trained network to determine a category to which the scintillator crystal corresponds. The scintillator crystal is assigned the quality value associated with its corresponding category. Embodiments may thereby provide an essentially unsupervised learning approach for objective evaluation of scintillator crystal quality.

Figure 1:
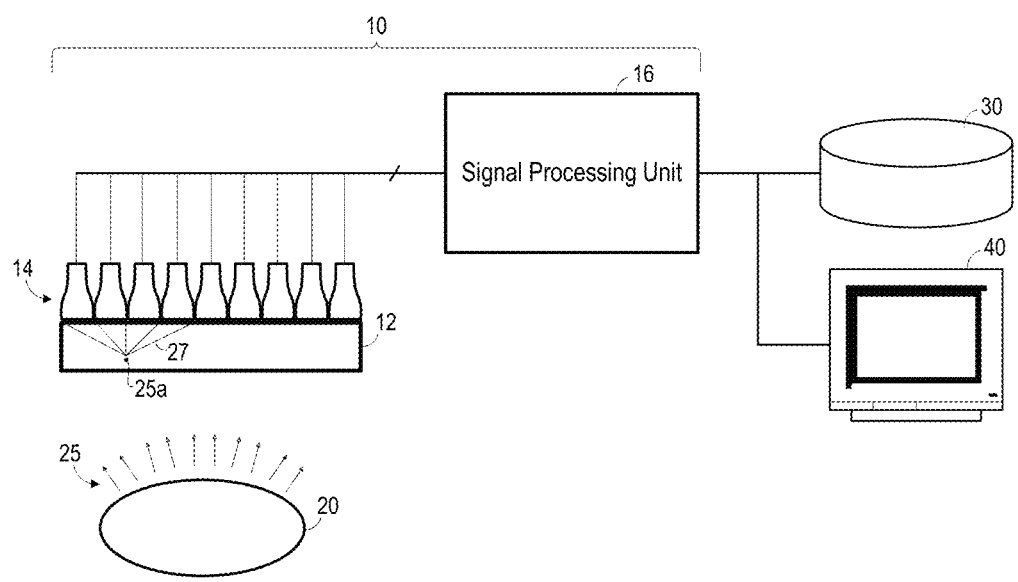
FIG. 1 is a block diagram of a scintillator-based imaging system according to some embodiments.

FIG. 1 illustrates detector 10 utilizing a scintillator crystal evaluated according to some embodiments. Detector 10 will be described below in the context of an Anger-type gamma camera, but embodiments are not limited thereto. Detector 10 may comprise any scintillator crystal-based imaging device (e.g., a Positron Emission Tomography scanner).

Detector 10 includes scintillation crystal 12, light sensor array 14, and a signal processing unit 16. Scintillation crystal 12 may comprise a thallium-doped sodium iodide crystal that generates light photons in response to gamma radiation 25 received from object 20 (e.g., a patient's body). Conventionally, a radioactive isotope (not shown) is administered to object 20. The radioactive isotope emits gamma photons while present in object 20, and these gamma photons 25 subsequently exit object 20. Gamma photons 25 are collimated by a collimator (not shown) disposed between object 20 and scintillation crystal 12 (to define their line-of-response and to filter out scattered or stray gamma radiation), and the thus-collimated photons are received at various locations of scintillation crystal 12. Scintillation crystal 12 converts the gamma radiation (e.g., gamma photon 25a) into light photons (e.g., light photons 27), which may be detected by sensor array 14.

Sensor array 14 may comprise an array of PMTs. A typical PMT of sensor array 14 may include a semi-transparent photocathode, a focusing grid, dynodes, and an anode (not shown). Sensor array 14 converts light photons emitted by scintillation crystal 12 into electronic signals representing the number of light photons collected. Signal processing unit 16 receives the electronic signals from the sensor array 14 and processes the electronic signals to generate an image of object 20. Images generated by signal processing unit 16 may be stored in data storage device 30 and/or displayed on display 40.

Figure 2:
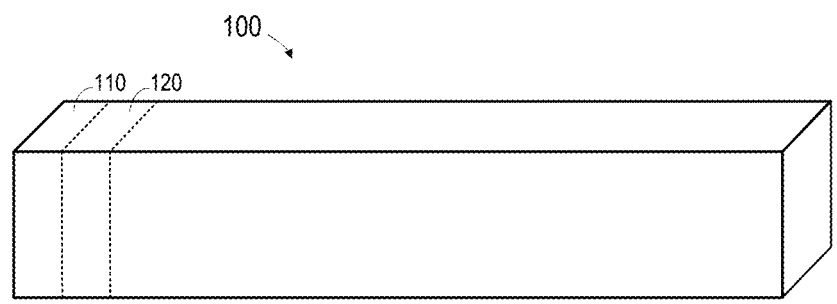
FIG. 2 depicts an imaging crystal ingot according to some embodiments.

FIG. 2 depicts crystal ingot 100 from which imaging scintillation crystals are created according to some embodiments. Formation of ingot 100 may begin with a pool of thallium-doped sodium iodide held within a platinum vessel. A seed crystal of sodium iodide is brought in contact with the pool from above and is allowed to grow radially until the resulting crystal formation is 60-80 cm in diameter. The formation is slowly lifted from the pool (which is replenished as needed) until it forms a 1 M-long cylinder. The cylinder is then forged into a rectangular shape as shown in FIG. 2 and cut into slabs. FIG. 2 shows slabs 110 and 120 prior to being cut from ingot 100. Embodiments are not limited to the foregoing crystal composition, formation process or shape.

Figure 3:
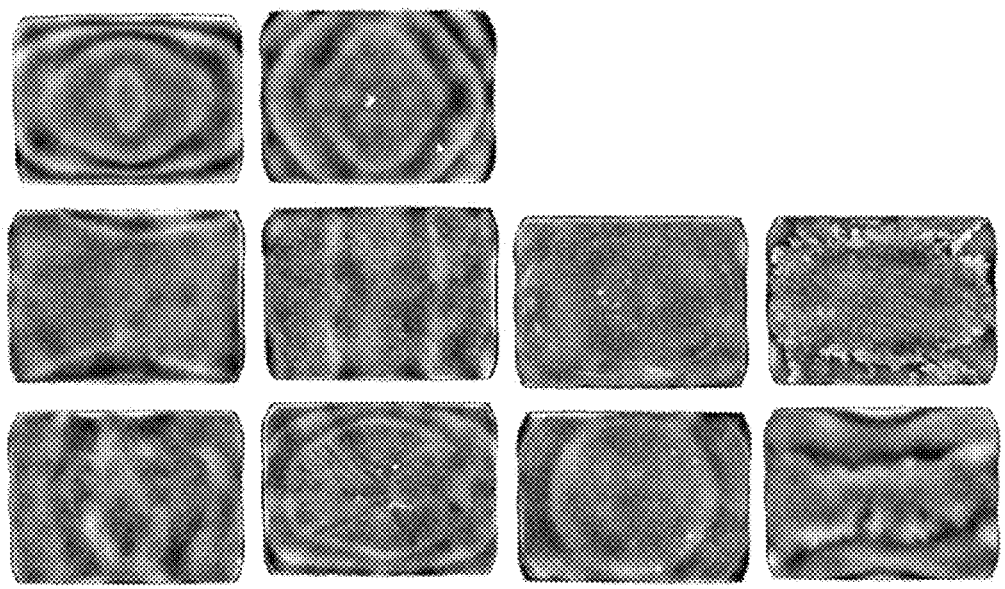
FIG. 3 depicts functional images of total deposited energy for each of several crystal slabs according to some embodiments.

Each slab may comprise an imaging scintillation crystal, and may be subjected to further processing prior to incorporation into an imaging system. FIG. 3 illustrates images of ten different scintillation crystal slabs which may be used for quality assurance purposes. The images are functional images of total deposited energy, which depict the total energy deposited by a point source located over the center of a detector into the corresponding pixel location in the crystal.

Non-ideal conditions at various steps of the fabrication process may introduce artifacts into the resulting slabs, which may then affect the corresponding functional images of the slabs. Certain fabrication steps may introduce certain types of artifacts, and certain types of artifacts might compromise crystal quality while other types of artifacts might not.

Figure 4:
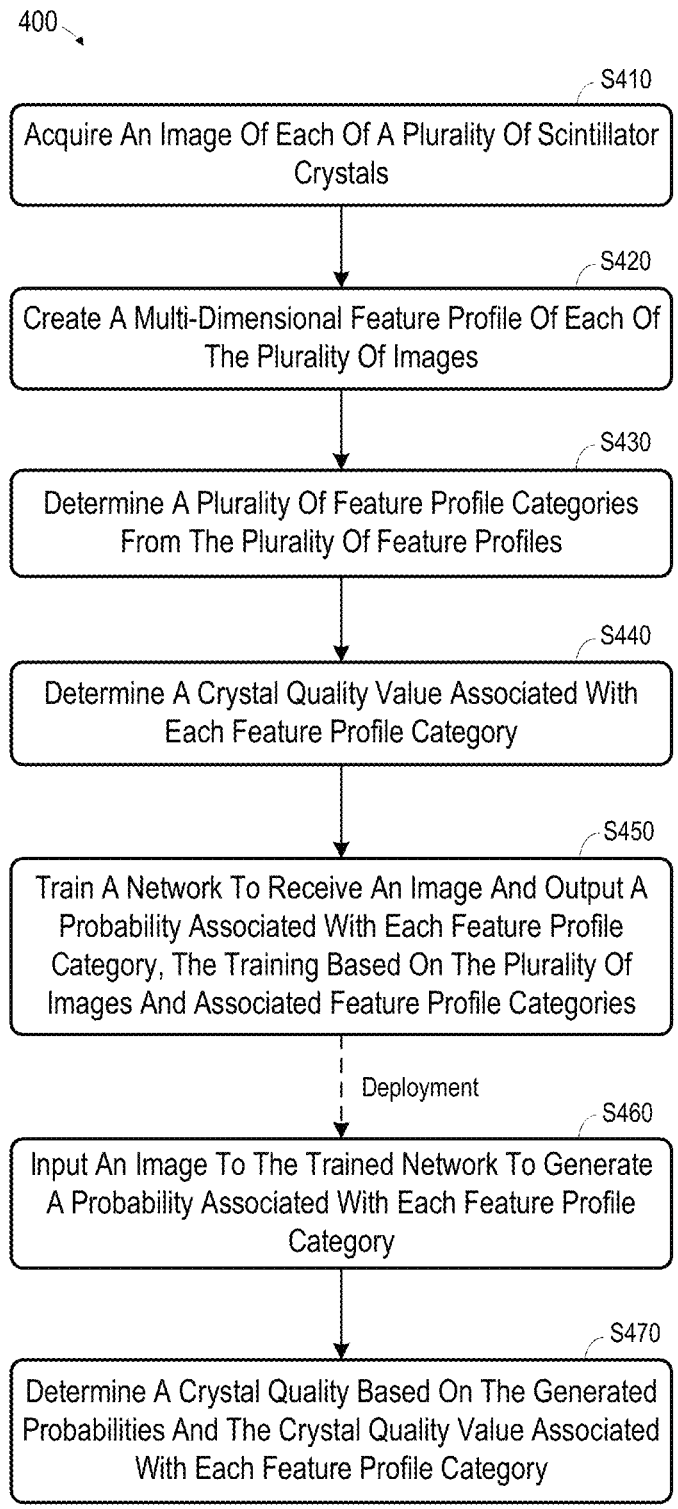
FIG. 4 is a flow diagram of a process to train and deploy a network to estimate crystal quality according to some embodiments.

FIG. 4 is a flow diagram of process 400 according to some embodiments. Process 400 and the other processes described herein may be performed using any suitable combination of hardware and software. Software program code embodying these processes may be stored by any non-transitory tangible medium, including a fixed disk, a volatile or non-volatile random access memory, a floppy disk, a CD, a DVD, a Flash drive, or a magnetic tape. Embodiments are not limited to the examples described below.

Initially, at S410, an image of each of a plurality of scintillator crystals is acquired. According to some embodiments, a set of images of each scintillator crystal is acquired at S410. For clarity, the foregoing example of process 400 will be described with respect to a single image per scintillator crystal.

Each image may comprise a quality assurance image formed using the respective scintillator crystal. For example, a scintillator crystal may be irradiated with gamma ray photons and the resulting light produced at each pixel of the scintillator crystal is measured. The light may be measured in terms of integrated energy, photon counts, or other measure. The measured light at each pixel is used to form an image of the scintillator crystal.

Next, at S420, a multi-dimensional feature profile of each of the acquired images is generated. A plurality of feature profile categories are determined based on the plurality of multi-dimensional feature profiles at S430.

Conventional systems for extracting features from images currently exist. Such systems include but are not limited to trained convolutional neural networks. Based on an input image, such systems may generate a value or weight associated with each of n image features. An array of all n weights generated for a given image may be considered an n-dimensional feature profile of the given image.

Similarly, the plurality of feature profile categories may be determined at S430 using an unsupervised clustering convolutional neural network. Such a network may identify feature profiles which are proximate to one another in n-dimensional space. A group of proximate feature profiles may be considered as belonging to a single feature profile category.

FIG. 5 illustrates system 500 to execute S420 and S430 according to some embodiments. As shown, crystal images 510 acquired at S410 are input to convolutional neural network 520. Convolutional neural network 520 includes both feature extraction component 522 and feature profile clustering component 524, although embodiments are not limited to performing both functions within a single network.

Feature extraction component 522 extracts a multi-dimensional feature profile from each of images 510. Feature profile clustering component 524 identifies clusters based on the feature profiles and determines a feature profile category for each cluster. Feature profile categories 530 may comprise data identifying each input image 510 and the feature profile category to which the image belongs.

FIG. 6 depicts clusters of feature profiles according to some embodiments. Each circle represents a feature profile associated with an input image (and, therefore, associated with a scintillator crystal). Graph 600 represents three-dimensional space in which each axis is associated with a detected feature or feature set, but feature profiles are not limited to three dimensions. According to some embodiments, feature extraction component 522 generates each of the depicted feature profiles and feature profile clustering component 524 identifies four clusters from the feature profiles, based on the relative proximity of the profiles in three-dimensional space. Each of the four clusters is labeled as a unique feature profile category, and each image and crystal is assigned to the feature profile category to which its feature profile belongs.

In some embodiments, each cluster may represent a set of image artifacts associated with a particular fabrication problem, or with a particular subset of fabrication problems. At least one cluster may be associated with a set of image artifacts associated with no fabrication problems.

Returning to process 400, a crystal quality value is determined for each feature profile category at S440. The crystal quality values may be determined by building imaging systems using a crystal slab associated with each category and determining a measure of quality for each category based on performance of the corresponding imaging system. For example, a measure of quality may be based on the gain of a photomultiplier tube that receives light from the scintillator, by the standard energy resolutions for certain nuclear isotopes, or by the detect efficiency (i.e., the percentage of gamma rays from a source passing through the scintillator that interact and are counted in the final spectrum). In some embodiments, the crystal quality values are determined by analyzing one or more crystals from each category via destructive processes. FIG. 7 illustrates table 700 which associates each feature profile category with a quality value determined at S440.

A network is trained at S450 to receive an image and output a feature profile category. The training is based on the images acquired at S410 and the feature profile categories determined for the acquired images. According to some embodiments, the output of the trained network consists of probabilities respectively associated with each possible feature profile category.

Figure 8:
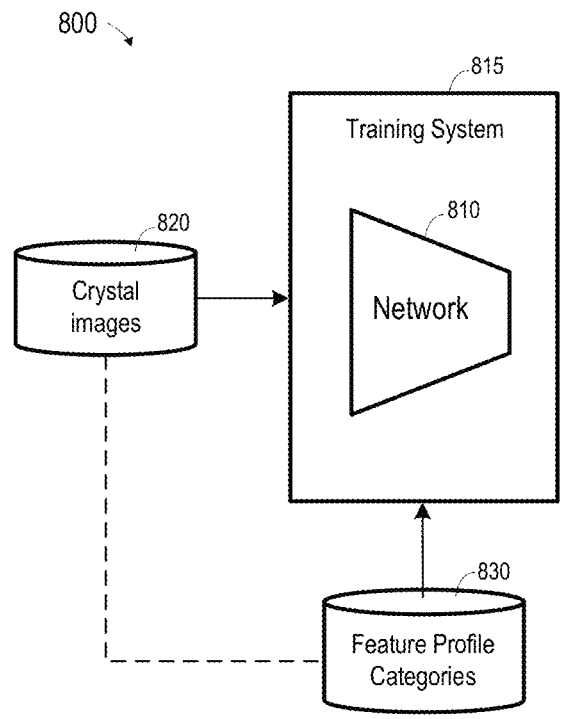
FIG. 8 is a block diagram of a system to train a network according to some embodiments.

FIG. 8 illustrates system 800 to train a network at S450 according to some embodiments. Network 810 is trained using training system 815, crystal images 820 and feature profile categories 830. Crystal images 820 may include images (or sets of images, as mentioned above) 0 through n and feature profile categories 830 may comprise one or more feature profile categories associated with each image (as indicated by the dashed line between images 820 and categories 830.

Broadly, network 810 may comprise a network of neurons which receive input, change internal state according to that input, and produce output depending on the input and internal state. The output of certain neurons is connected to the input of other neurons to form a directed and weighted graph. The weights as well as the functions that compute the internal state can be modified by a training process based on ground truth data. Network 810 may comprise any one or more types of artificial neural network that are or become known, including but not limited to convolutional neural networks, recurrent neural networks, long short-term memory networks, deep reservoir computing and deep echo state networks, deep belief networks, and deep stacking networks.

Network 810 may be trained using training system 815 as is known in the art to generate a function. Training system 815 may comprise any system or systems for training an artificial neural network that are or become known. For example, training system 815 may employ supervised learning, unsupervised learning and/or reinforcement learning used as a function approximator as is known in the context of deep neural networks. Generative adversarial networks may be used including a generative and a discriminative network as is known.

Figure 9:
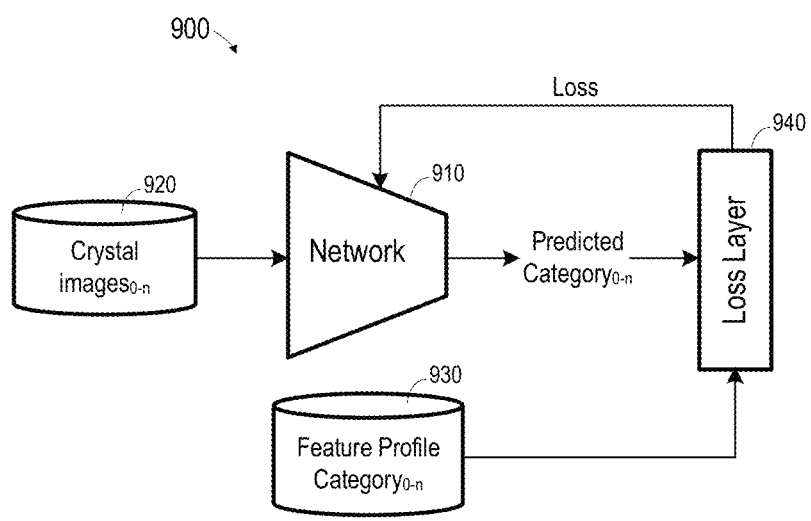
FIG. 9 is a block diagram of a system to train a network according to some embodiments.

FIG. 9 illustrates training architecture 900 to train a network at S450 according to some embodiments. Embodiments are not limited to the type of training depicted in FIG. 9.

During training, network 910 receives crystal image$_{0-n}$ 920. Based on its initial configuration and design, network 910 outputs a predicted category based on each received crystal image$_{0-n}$ 920. Loss layer component 940 determines a loss by comparing each predicted category$_{0-n}$ generated based on an input crystal image$_{0-n}$ 920 to the actual feature profile category$_{0-n}$ 930 corresponding to the input crystal image$_{0-n}$ 920. For example, network 910 generates predicted category$_9$ based on crystal image$_9$. Loss layer component 940 determines a loss based on a difference between predicted category$_9$ and actual category$_9$ 930 corresponding to crystal image$_9$. The foregoing is performed for each crystal image$_{0-n}$ to determine a total loss. The loss may comprise an L1 loss, and L2 loss, or any other suitable measure of total loss.

The total loss is back-propagated from loss layer component 940 to network 910, which changes its internal weights in response as is known in the art. The process repeats until it is determined that the total loss has reached an acceptable level or training otherwise terminates.

According to some embodiments, the trained neural network implements a function. The function may be characterized as a set of parameter values associated with each network node. In one example, the function is represented by parameter values for kernels of a fully convolutional network. The function (e.g., embodied in parameter values of trained convolutional kernels) may be deployed after S450 as is known in the art to an external system such as system 1000 of FIG. 10. The computing system in which is the trained network is deployed may be different from the computing system used to train the network. Network 1010 of system 1000 may comprise any type of computing system to implement the learned functions resulting from the training of a neural network.

An image is input to the trained network at S460. Consequently, the trained network outputs an indication of one or more feature profile categories associated with the input image. As mentioned above, the indication may comprise a respective probability associated with each of two or more feature profile categories.

Figure 10:
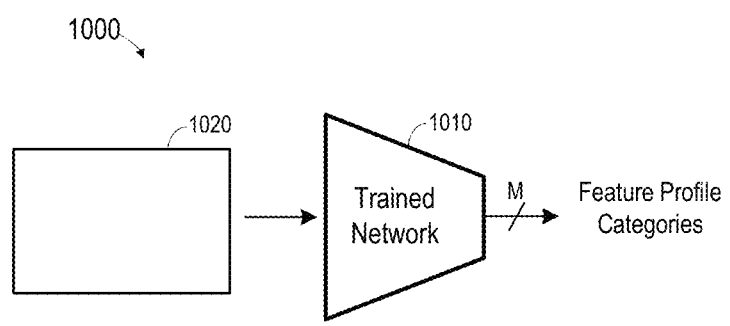
FIG. 10 is a block diagram of a system deploying a trained network to estimate crystal quality according to some embodiments.

With respect to FIG. 10, crystal image 1020 is input to trained network 1010 at S460. Trained network 1010 operates according to its implemented function to output a probability associated with each of M feature profile categories. A greater probability indicates a higher likelihood that the crystal associated with image 1020 belongs to the associated category.

At S470, a crystal quality is determined based on the output of the trained network. According to some embodiments, the crystal quality is determined based on output probabilities associated with each of M feature profile categories and on crystal quality values determined at S440 for each feature profile category. In a simple case, the crystal quality determined at S440 is equal to the crystal quality value determined at S440 for the feature profile category associated with the highest output probability. In another case, determination of the crystal quality at S440 includes weighting the crystal quality values of each feature profile category according to its determined probability. S470 may comprise any system to determine the crystal quality based on the output of the trained network and the previously-determined crystal quality values.

In some embodiments, network 810 is trained based on quality values associated with each feature profile category, rather than based on feature profile categories 830. Specifically, each of crystal images 820 is labeled by an associated quality value and network 810 is trained based on this labeled training set. Accordingly, at S460, input of image 1020 into thusly-trained network 1010 results in output of a probability associated with each crystal quality value. S470 may then comprise determining a pass/fail value based on the output probabilities.

Figure 11:
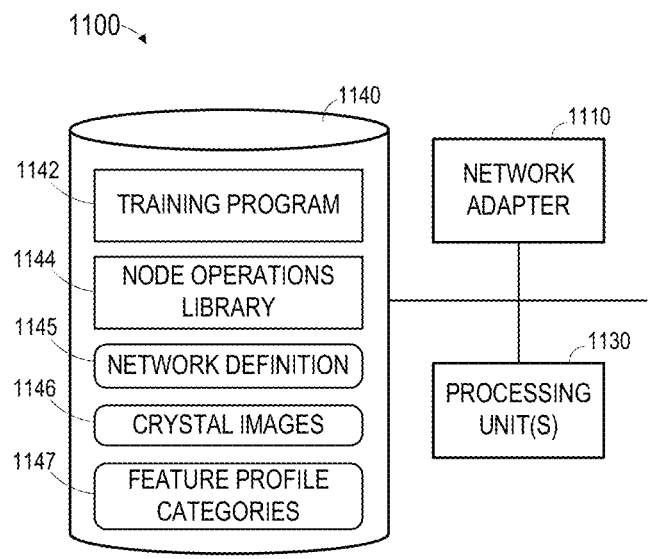
FIG. 11 is a block diagram of a computing system to train a network to estimate crystal quality according to some embodiments.

FIG. 11 illustrates computing system 1100 according to some embodiments. System 1100 may comprise a computing system to facilitate the design and training of a network as is known in the art. Computing system 1100 may comprise a standalone system, or one or more elements of computing system 1100 may be located in the cloud.

System 1100 includes network adapter 1110 to communicate with external devices via a network connection. Processing unit(s) 1130 may comprise one or more processors, processor cores, or other processing units to execute processor-executable process steps. In this regard, storage system 1140, which may comprise one or more memory devices (e.g., a hard disk drive, a solid-state drive), stores processor-executable process steps of training program 1142 which may be executed by processing unit(s) 1130 to train a network as described herein.

Training program 1142 may utilize node operations library 1144, which includes code to execute various operations associated with node operations as defined in node operations library 1144. According to some embodiments, computing system 1100 provides interfaces and development software (not shown) to enable development of training program 1142 and generation of network definition 1145. Storage device 1140 also includes crystal images 1146 and feature profile categories 1147, which may be used by training program 1142 as described above to train a network defined within definition 1145.

Figure 12:
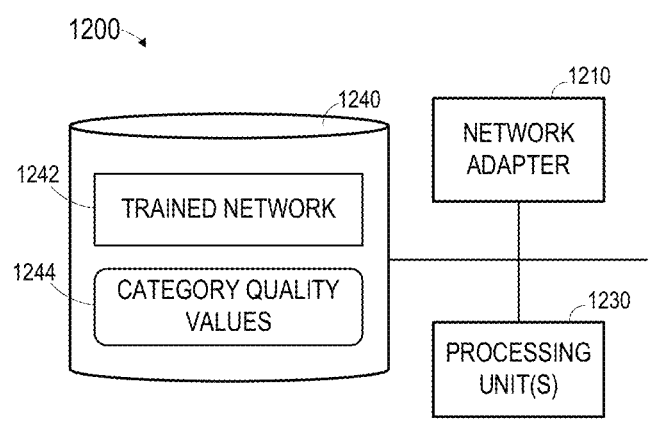
FIG. 12 is a block diagram of a computing system deploying a trained network to estimate crystal quality according to some embodiments.

FIG. 12 illustrates system 1200 in which a trained network may be deployed according to some embodiments. Generally, imaging system 1200 may acquire an image of a scintillator crystal and determine a quality using a trained network as described above with respect to S460 and S470.

Embodiments are not limited to system 1200 or to any imaging system. For example, system 1200 may also include imaging hardware to acquire a crystal image, and/or other hardware and software components to perform other quality assurance functions. System 1200 includes network adapter 1210 to communicate with external devices via a network connection.

One or more processing units 1230 may execute processor-executable program code implementing trained network 1242. The code may implement convolution kernels or other data structures exported by system 1100 after training of a network. Trained network 1242 may be executed to receive a crystal image data, determine one or more feature profile categories, and determine a crystal quality based on the one or more feature profile categories and category quality values 1244. Storage device 1240 may comprise one or more fixed disks, solid-state random access memory, and/or removable media (e.g., a thumb drive) mounted in a corresponding interface (e.g., a USB port).

Each functional component described herein may be implemented at least in part in computer hardware, in program code and/or in one or more computing systems executing such program code as is known in the art. Such a computing system may include one or more processing units which execute processor-executable program code stored in a memory system.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid state Random Access Memory (RAM) or Read Only Memory (ROM) storage units. Embodiments are therefore not limited to any specific combination of hardware and software.

Those in the art will appreciate that various adaptations and modifications of the above-described embodiments can be configured without departing from the claims. Therefore, it is to be understood that the claims may be practiced other than as specifically described herein.

What is claimed is:

1. A computing system comprising:
    a storage system;
    one or more processors to execute processor-executable process steps stored on the storage system to cause the computing system to:
        acquire an image of each of a plurality of scintillator crystals;
        determine a plurality of categories based on the plurality of images, where each of the plurality of images is associated with one of the categories, and where at least two of the plurality of categories are respectively associated with one or more scintillator crystal fabrication problems;
        determine a crystal quality value associated with each of the plurality of categories;
        train a network to receive an input image and output one of the plurality of categories based on the input image, the training based on the plurality of images and the category associated with each image;
        operate the trained network to receive a first image of a first scintillator crystal and output a first one of the plurality of categories based on the first image; and
        determine a quality of the first scintillator crystal based on the first one of the plurality of categories and a first crystal quality value associated with the first one of the plurality of categories.

2. A computing system according to claim 1, wherein determination of the plurality of categories comprises:
    extraction of a feature profile from each of the plurality of images;
    determination of a plurality of clusters of the feature profiles; and
    determination of a category associated with each of the clusters.

3. A computing system according to claim 2, wherein extraction of a feature profile from each of the plurality of images and determination of the plurality of clusters comprises execution of a convolutional network.

4. A computing system according to claim 1, wherein training of the network comprises:
    training of the network to receive an input image and output a probability associated with each of two or more of the plurality of categories based on the input image.

5. A computing system according to claim 4, wherein determination of the quality of the first scintillator crystal comprises:
    determination of the quality of the first scintillator crystal based on the probability associated with each of two or more of the plurality of categories and crystal quality values associated with each of the two or more of the plurality of categories.

6. A computing system according to claim 5, the one or more processors to execute processor-executable process steps stored on the storage system to cause the computing system to:
    operate the trained network to receive a second image of a second scintillator crystal and output a second probability associated with each of a second two or more of the plurality of categories based on the second input image; and
    determine a quality of the second scintillator crystal based on the second probability associated with each of the second two or more of the plurality of categories and crystal quality values associated with each of the second two or more of the plurality of categories.

7. A computing system according to claim 1, the one or more processors to execute processor-executable process steps stored on the storage system to cause the computing system to:
    operate the trained network to receive a second image of a second scintillator crystal and output a second one of the plurality of categories based on the second image; and
    determine a quality of the second scintillator crystal based on the second one of the plurality of categories and a second crystal quality value associated with the second one of the plurality of categories.

8. A computer-implemented method comprising:
acquiring a plurality of images, each of the plurality of images depicting a respective scintillator crystal;
determining a plurality of categories based on the plurality of images, where each of the plurality of images is associated with at least one of the categories, and where at least two of the plurality of categories are respectively associated with one or more scintillator crystal fabrication problems;
determining a crystal quality value associated with each of the plurality of categories;
training a network to receive an input image and output an indication of one of the plurality of categories based on the input image, the training based on the plurality of images and the at least one category associated with each the plurality of images;
operating the trained network to receive a first image of a first scintillator crystal and output a first one of the plurality of categories based on the first image; and
determining a quality of the first scintillator crystal based on the first one of the plurality of categories and a first crystal quality value associated with the first one of the plurality of categories.

9. A method according to claim 8, wherein determining the plurality of categories comprises:
extracting a feature profile from each of the plurality of images;
determining a plurality of clusters of the feature profiles; and
determining a category associated with each of the clusters.

10. A method according to claim 9, wherein extracting a feature profile from each of the plurality of images and determining the plurality of clusters comprises executing a convolutional network.

11. A method according to claim 8, wherein training the network comprises:
training the network to receive an input image and output a probability associated with each of two or more of the plurality of categories based on the input image.

12. A method according to claim 11, wherein determining the quality of the first scintillator crystal comprises:
determining the quality of the first scintillator crystal based on the probability associated with each of two or more of the plurality of categories and crystal quality values associated with each of the two or more of the plurality of categories.

13. A method according to claim 12, further comprising:
operating the trained network to receive a second image of a second scintillator crystal and output a second probability associated with each of a second two or more of the plurality of categories based on the second input image; and
determining a quality of the second scintillator crystal based on the second probability associated with each of the second two or more of the plurality of categories and crystal quality values associated with each of the second two or more of the plurality of categories.

14. A method according to claim 8, further comprising:
operating the trained network to receive a second image of a second scintillator crystal and output a second one of the plurality of categories based on the second image; and
determining a quality of the second scintillator crystal based on the second one of the plurality of categories and a second crystal quality value associated with the second one of the plurality of categories.

15. A system comprising:
a storage system to store a crystal quality value associated with each of a plurality of feature profile categories, where at least two of the plurality of feature profile categories are respectively associated with one or more scintillator crystal fabrication problems; and
a computing system to:
receive a first image of a first scintillator crystal and output one of the plurality of feature profile categories based on the first image;
determine a quality of the first scintillator crystal based on the output one of the plurality of feature profile categories and a first crystal quality value associated with the output one of the plurality of feature profile categories.

16. A system according to claim 15, the computing system to receive the first image of the first scintillator crystal and output a probability associated with each of two or more of the plurality of feature profile categories based on the first image.

17. A system according to claim 16, wherein determination of the quality of the first scintillator crystal comprises:
determination of the quality of the first scintillator crystal based on the probability associated with each of the two or more of the plurality of feature profile categories and crystal quality values associated with each of the two or more of the plurality of categories.

18. A system according to claim 17, the computing system to:
receive a second image of a second scintillator crystal and output a second probability associated with each of a second two or more of the plurality of feature profile categories based on the second image; and
determine a quality of the second scintillator crystal based on the second probability associated with each of the second two or more of the plurality of feature profile categories and crystal quality values associated with each of the second two or more of the plurality of categories.

19. A system according to claim 15, the computing system to:
receive a second image of a second scintillator crystal and output a second one of the plurality of feature profile categories based on the second image;
determine a quality of the second scintillator crystal based on the output second one of the plurality of feature profile categories and a second crystal quality value associated with the output second one of the plurality of feature profile categories.

* * * * *